United States Patent
Vagi et al.

[15] 3,678,635
[45] July 25, 1972

[54] ASSEMBLY HAVING INTEGRAL SEALING MEANS

[72] Inventors: Louis D. Vagi, Inkster; Maurice M. Westerdale, Dearborn, both of Mich.

[73] Assignee: Ford Motor Company, Dearborn, Mich.

[22] Filed: March 26, 1971

[21] Appl. No.: 128,426

[52] U.S. Cl. ................................52/28, 240/8.1 R, 240/8.2, 248/27
[51] Int. Cl. ............................................B60q 1/32
[58] Field of Search..............52/28, 27, 173, 393, 400, 403, 52/510; 248/26, 27; 240/8.1 R, 8.2, 8.22

[56] References Cited

UNITED STATES PATENTS 2,218,731 10/1940 Tuck et al. ............................52/28 X
2,640,910 6/1953 Talley...............................240/8.1 R X
3,067,974 12/1962 Baldwin..................................248/27

*Primary Examiner*—Price C. Faw, Jr.
*Attorney*—John R. Faulkner and John J. Roethel

[57] ABSTRACT

An assembly of an accessory base member to a panel having an aperture therein, the aperture being concealed beneath the base member. The base member has a continuous peripheral flange adapted to abut the panel and an integral continuous flexible skirt located between the flange and the aperture edge. With the base member mounted on the panel, the flexible skirt deforms against the panel to provide a compression seal between the base member and the panel. The compression seal prevents entry of water and dust into the vehicle body through the aperture.

4 Claims, 2 Drawing Figures

Patented July 25, 1972  3,678,635

INVENTORS.
Louis D. Vagi
Maurice M. Westerdale
BY John R. Faulkner
John J. Roethel
ATTORNEYS.

ASSEMBLY HAVING INTEGRAL SEALING MEANS

BACKGROUND OF THE INVENTION

The conventional method of providing a seal between the base member of an accessory and an apertured panel on which the accessory is mounted is by use of a separate gasket or sealing member. For example, the convention installation of a side marker lamp on a rear fender panel of an automobile body, the panel being apertured to receive a lamp bulb socket or the portion of the accessory base member providing the lamp bulb socket, involves the placement of a neoprene die-cut seal or gasket between the base member and the abutting panel surface. The seal functions to keep water and dust from entering the vehicle body through the aperture in the panel.

Although the seals are relatively inexpensive, the large number that are used in a year production of vehicles by a major automobile manufacturer represents a substantial expenditure. It is an object of the present invention to mold the accessory base member of a material, such as plastic, that can be formed with a flexible skirt adapted to function as a compression seal when the base member is mounted on a panel.

SUMMARY OF THE INVENTION

The present invention relates to an assembly comprising an apertured panel and an accessory mounted on the panel. The accessory has a base member adapted to conceal the panel aperture therebeneath. The base member has a continuous peripheral flange abutting the panel in space relationship to the edge of the aperture. Between the accessory flange and the edge of the aperture is a continuous flexible skirt extending from the base member. This flexible skirt in pre-mounted condition of the base member projects beyond the panel abutting flange, and in mounted condition is deformed against the panel to provide a compression seal between the base member and the panel.

In a preferred form of the invention, the base member is molded from a stiffly resilient synthetic resin and has the flange and skirt integrally formed thereon.

DESCRIPTION OF THE DRAWINGS

Other objects, advantages and features of the present invention can be made more apparent as this description proceeds, reference being had to the accompanying drawings, wherein.

DETAILED DESCRIPTION OF THE INVENTION

Figure 1:
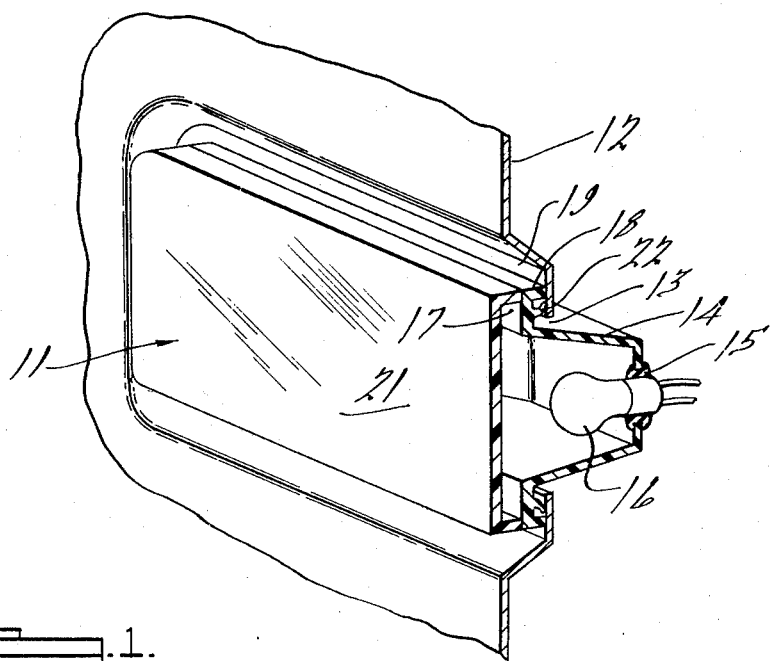
FIG. 1 is a fragmentary perspective view of an assembly as embodied in the present invention.

Referring now to the drawings and more particularly to FIG. 1, there is shown an assembly comprising a vehicle side marker lamp, generally designated 11, mounted on a vehicle panel 12. The panel 12 has an aperture 13, for a reason to become apparent.

It will be understood that the present invention is not limited to vehicle side marker lamps but that the marker lamp is a typical accessory to which the principle features of the present invention are particular applicable.

The side marker lamp 11 comprises a lamp housing having a body or base member 14 formed as a reflector and having a socket 15 adapted to receive a lamp bulb 16. The body or base member 14 is preferably molded of an acrylo-nitrile-butadiene-styrene copolymer plastic. The base member has a front wall 17 terminating in a continuous peripheral flange 18 adapted to abut the outer surface 19 of the panel 12.

The lamp housing is completed by an acrylic lens 21 which is sonically welded to the front wall 17 of the body or base member 14.

The aperture 13 in the panel 12 permits a portion of the body or base member to project through the panel so that the lens 21 can have a substantially flush relationship to the outer panel 12. Since the panel 12 quite frequently is an outer wall of a vehicle body compartment, such as the luggage compartment, it is necessary to provide a seal between the body or base member flange 18 and the outer surface 19 of the panel 12 to protect against moisture and dust infiltration into the vehicle compartment.

In a conventional installation, a die-cut neoprene seal or gasket is used. The body or base member 14 is usually secured to the panel 12 by mounting studs (not shown) and the nuts on these studs are tightened down to place the seal or gasket under compression. Although relatively inexpensive on a per piece basis, the number of seals used in the manufacture of a high volume vehicle model results in a substantial cost item.

Figure 2:
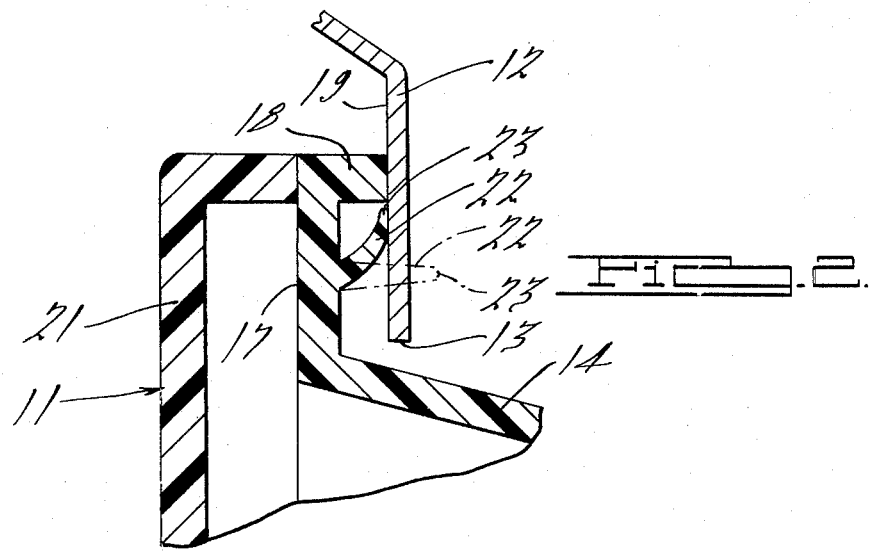
FIG. 2 is an enlarged fragmentary sectional view showing the construction and arrangement embodied in the present invention.

Accordingly, the present invention proposes the elimination of the die-cut neoprene seal or gasket. This is done by taking advantage of the fact that the body or base member 14 is a molded plastic piece. Inwardly of the flange 18 an integral continuous flexible skirt 22 is molded on the body or base member. As best seen in FIG. 2, the skirt 22 in free form (dot and dash outline) has a tapered cross section, being thicker at the base or connection to the wall 17 than it is at its distal end 23. The skirt 22 is substantially thinner than the adjacent flange 18 and is somewhat longer than the flange. As a result, it is more flexible. It is positioned on the inner surface of the wall 17 so that it lies intermediate the edge of the aperture 13 and the flange 18 when the body or base member 14 overlies and conceals the aperture therebeneath.

As shown in solid outline in FIG. 2, when the body or base member 14 is positioned on the wall 17 so that the flange 18 abuts the wall, the flexible skirt is deformed to provide a compression seal between the base member wall 17 and the panel 12.

It will be readily apparent that a seal of the integral flexible skirt type will have many applications to accessories having molded plastic base members which are adapted to be mounted on panels having an aperture that must be sealed against the passage of water and dust. This applies whether the aperture receives a part of the base member or merely receives a retention device or wires leading to a lamp bulb.

It will be understood that the invention is not to be limited to the exact construction shown and described but various changes and modifications may be made without departing from the spirit and scope of the invention.

We claim:

1. An assembly comprising:
   a panel having an aperture therein,
   an accessory mounted on the panel having a base member concealing the panel aperture therebeneath
   the base member having a continuous peripheral flange abutting the panel in spaced relationship to the edge of the aperture,
   and a continuous flexible skirt extending from the base member between the flange and the edge of the aperture,
   the flexible skirt in pre-mounted condition of the base member projecting beyond the panel abutting flange and in mounted condition being deformed against the panel to provide a compression seal between the base member and the panel.

2. An assembly according to claim 1, in which:
   the base member is of molded stiffly resilient synthetic resin and has the flange and skirt integrally formed thereon.

3. An assembly according to claim 2, in which:
   the flange is of a wall thickness wherein it is relatively stiff and the skirt is substantially thinner than the flange and tapers to a decreased thickness from its attachment to the base member toward its distal end to provide increased flexibility toward its contact area with the panel.

4. An assembly according to claim 1, in which:
   the flange is substantially thicker than the skirt,
   and the skirt tapers to a decreased thickness from its attachment to the base member to its distal end to provide increased flexibility toward the panel contacting end.

* * * * *